United States Patent
Liu et al.

(10) Patent No.: US 9,924,226 B2
(45) Date of Patent: Mar. 20, 2018

(54) METHOD AND DEVICE FOR PROCESSING IDENTIFICATION OF VIDEO FILE

(71) Applicant: Xiaomi Inc., Beijing (CN)

(72) Inventors: Jie Liu, Beijing (CN); Xiaoyong Wu, Beijing (CN); Wei Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/161,940

(22) Filed: May 23, 2016

(65) Prior Publication Data

US 2016/0353167 A1    Dec. 1, 2016

(30) Foreign Application Priority Data

May 29, 2015 (CN) .......................... 2015 1 0290508

(51) Int. Cl.
| | |
|---|---|
| *H04H 60/32* | (2008.01) |
| *H04N 21/454* | (2011.01) |
| *H04H 60/59* | (2008.01) |
| *G06K 9/00* | (2006.01) |
| *H04N 21/234* | (2011.01) |
| *H04N 21/44* | (2011.01) |
| *H04N 21/8352* | (2011.01) |
| *H04N 21/437* | (2011.01) |

(Continued)

(52) U.S. Cl.
CPC ........ *H04N 21/4542* (2013.01); *G06K 9/00* (2013.01); *H04H 60/59* (2013.01); *H04N 21/23418* (2013.01); *H04N 21/437* (2013.01); *H04N 21/44008* (2013.01); *H04N 21/812* (2013.01); *H04N 21/8352* (2013.01); *H04N 21/8455* (2013.01)

(58) Field of Classification Search
None
See application file for complete search history.

(56) References Cited

U.S. PATENT DOCUMENTS 8,175,413 B1 * 5/2012 Ioffe .................. G06K 9/20
                                                    382/100
8,934,734 B1    1/2015 Ioffe et al.
(Continued)

FOREIGN PATENT DOCUMENTS

| | | |
|---|---|---|
| CN | 101739561 A | 6/2010 |
| CN | 101950366 A | 1/2011 |

(Continued)

OTHER PUBLICATIONS

Wei-Qi Yan et al., Erasing video logos based on image inpainting, 2002, Multimedia and Expo, 2002. ICME '02. Proceedings, pp. 521-523.*

(Continued)

*Primary Examiner* — Jason K Lin
(74) *Attorney, Agent, or Firm* — Oblon, McClelland, Maier & Neustadt, L.L.P.

(57) ABSTRACT

The present disclosure relates to a method and a device for processing an identification of a video file. The method includes detecting a video on a display of a device, wherein the video includes a plurality of frames; identifying a detection area in at least one frame of the plurality of frames of the video; detecting a video identification mark in the detection area of the at least one frame; and concealing the video identification mark based on pixel values of boundary pixels of the detection area.

13 Claims, 7 Drawing Sheets

(51) Int. Cl.
*H04N 21/81* (2011.01)
*H04N 21/845* (2011.01)

(56) References Cited

U.S. PATENT DOCUMENTS

| | | | |
|---|---|---|---|
| 2006/0153470 A1* | 7/2006 | Simon | G06K 9/00234 |
| | | | 382/254 |
| 2007/0052854 A1 | 3/2007 | Yeh et al. | |
| 2008/0138030 A1* | 6/2008 | Bryan | H04N 5/4403 |
| | | | 386/343 |
| 2010/0027886 A1* | 2/2010 | Kang | H04N 9/045 |
| | | | 382/167 |
| 2012/0177249 A1 | 7/2012 | Levy et al. | |
| 2013/0182184 A1* | 7/2013 | Senlet | H04N 5/272 |
| | | | 348/586 |
| 2013/0272678 A1 | 10/2013 | Bryan et al. | |
| 2014/0047475 A1 | 2/2014 | Oh et al. | |
| 2014/0079321 A1 | 3/2014 | Huynh-Thu et al. | |
| 2014/0115618 A1 | 4/2014 | Harada et al. | |
| 2014/0270504 A1 | 9/2014 | Baum et al. | |
| 2015/0125029 A1* | 5/2015 | Li | G06K 9/2054 |
| | | | 382/103 |
| 2015/0139545 A1 | 5/2015 | Guntur et al. | |
| 2015/0242698 A1 | 8/2015 | Baum et al. | |
| 2015/0334459 A1 | 11/2015 | Oh et al. | |
| 2016/0295287 A1 | 10/2016 | Jiang et al. | |

FOREIGN PATENT DOCUMENTS

| | | | | |
|---|---|---|---|---|
| CN | 102281384 A | | 12/2011 | |
| CN | 102426647 A | | 4/2012 | |
| CN | 103634652 A | * | 3/2014 | ........... G06K 9/3266 |
| CN | 104023249 A | | 9/2014 | |
| CN | 104918107 A | | 9/2015 | |
| JP | 2000-350095 A | | 12/2000 | |
| JP | 2003-333424 A | | 11/2003 | |
| JP | 2006-148263 A | | 6/2006 | |
| JP | 2014-110531 A | | 6/2014 | |
| KR | 10-2012-0063798 A | | 6/2012 | |
| KR | 10-1755412 B1 | | 7/2017 | |
| RU | 2450342 C1 | | 5/2012 | |
| RU | 2012 103 841 A | | 8/2013 | |
| WO | WO 2015/188670 A1 | | 12/2015 | |

OTHER PUBLICATIONS

Katrin Meisinger et al., Automatic TV Logo Removal Using Statistical Based Logo Detection and Frequency Selective Inpainting, 2005, IEEE.*
Wie-Qi Yan et al., Automatic video logo detection and removal, Jul. 7, 2005, pp. 379-391.*
Chung-Ming Kuo et al., Broadcast Video Logo Detection and Removing, 2008, IEEE, pp. 837-840*
Lucia Carreira et al., Automatic Letter/Pillarbox Detection for Optimized Display of Digital TV, Aug. 28-30, 2014, IEEE.*
Wikipedia—Weighted arithmetic mean, Apr. 27 2014, p. 1-4.*
International Search Report dated Mar. 4, 2016 to International Patent Application No. PCT/CN2015/095145, with English translation of category of cited Documents.
International Search Report dated Mar. 4, 2016 in PCT/CN2015/095145 (reference previously filed, submitting English language translation only).
Extended European Search Report dated Oct. 20, 2016 in Patent Application No. 16170297.2.
Combined Office Action and Search Report dated Nov. 16, 2016 in Russian Patent Application No. 2016114550/07 (with English language translation).
Antonio Criminisi, et al., "Region Filling and Object Removal by Exemplar-Based Image Inpainting" IEEE Transactions on Image Processing, vol. 13, No. 9, Sep. 2004, pp. 1200-1212.
Wei-Qi Yan, et al., "Automatic video logo detection and removal" Multimedia Systems, Regular Paper, Jul. 7, 2005, pp. 379-391.
Katrin Meisinger, et al., "Automatic TV Logo Removal Using Statistical Based Logo Detection and Frequency Selective Inpainting" Chair of Multimedia Communications and Signal Processing, Sep. 2005, 4 Pages.
Office Action dated Aug. 22, 2017 in Japanese Patent Application No. 2017-521284.
Office Action dated Jun. 28, 2017 in Chinese Patent Application No. 201510290508.4.
Office Action dated Nov. 10, 2017, in Mexican Patent Application No. MX/a/2016/005071.

* cited by examiner

METHOD AND DEVICE FOR PROCESSING IDENTIFICATION OF VIDEO FILE

CROSS-REFERENCE TO RELATED APPLICATIONS

This application is based upon and claims priority to Chinese Patent Application No. 201510290508.4, filed May 29, 2015, the entire contents of which are incorporated herein by reference.

TECHNICAL FIELD

The present disclosure generally relates to the field of video processing, and more particularly, to a method and a device for processing an identification of a video file.

BACKGROUND

With rapid development of smart televisions (TVs), a full-open platform provided by the smart TV enables the user to appreciate contents of normal TVs, and enables the user to appreciate video files provided by individual video websites at the same time. In the related art, for purpose of advertising the video website, a video website generally adds a video identification in a video file provided by itself, so as to achieve the purpose of advertisement by the video identification.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method including detecting a video on a display of a device, wherein the video includes a plurality of frames; identifying a detection area in at least one frame of the plurality of frames of the video; detecting a video identification mark in the detection area of the at least one frame; and concealing the video identification mark based on pixel values of boundary pixels of the detection area.

When identifying the detection area, the method includes selecting a number of frames from the plurality of frames of the video; and detecting the detection area based on the selected number of frames.

When identifying the detection area, the method also includes estimating an area in a probable location of the video identification mark in each of the selected number of frames; and performing an edge detection in the estimated area in each of the selected number of frames to determine the detection area of the video.

When identifying the detection area, the method also includes sending information associated with the video to a server; and receiving from the server a location of the detection area of the video based on the information.

When detecting the video identification mark, the method includes determining an identification pyramid of the video, the identification pyramid including a plurality of identification masks; matching the plurality of identification masks with image content in the detection area; obtaining a number of matches based on the matching; determining whether the number of matches is greater than a threshold number of matches; and determining that the video identification mark exists in the frame when the number of matches is greater than the threshold number of matches.

When concealing the video identification mark, the method includes determining a new pixel value of a pixel in the detection area at a center of a set size mask by known pixel values in the mask along an edge direction of the detection area and towards a center of the detection area; modifying an original pixel value of the pixel in the detection area at the center of the mask according to the new pixel value; and displaying the modified new pixel value in the frame.

The boundary pixels of the detection area are determined by the following equation:

$$I(p) = \frac{\sum_{q \in B_\epsilon(p)} w(p,q)[I(q) + \nabla I(q)(p-q)]}{\sum_{q \in B_\epsilon(p)} w(p,q)}$$

In this equation, p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and $\nabla I(q)$ indicates a gradient value of the known pixel.

The method also includes concealing the video identification mark with a preset box when the detection area in the frame of the video cannot be identified.

Aspects of the disclosure also provide a device that includes a processor and a memory for storing instructions executable by the processor. The processor is configured to detect a video on a display of a device, wherein the video includes a plurality of frames; identify a detection area in at least one frame of the plurality of frames of the video; detect a video identification mark in the detection area of the at least one frame; and conceal the video identification mark based on pixel values of boundary pixels of the detection area.

The processor is further configured to select a number of frames from the plurality of frames of the video; and detect the detection area based on the selected number of frames.

The processor is further configured to estimate an area in a probable location of the video identification mark in each of the selected number of frames; and perform an edge detection in the estimated area in each of the selected number of frames to determine the detection area of the video.

The processor is further configured to send information associated with the video to a server; and receive from the server a location of the detection area of the video based on the information.

The processor is further configured to determine an identification pyramid of the video, the identification pyramid including a plurality of identification masks; match the determined plurality of identification masks with image content in the detection area; obtain a number of matches based on the matching; determine whether the number of matches is greater than a threshold number of matches; and determine that the video identification mark exists in the frame when the number of matches is greater than the threshold number of matches.

The processor is further configured to determine a new pixel value of a pixel in the detection area at a center of a set size mask by known pixel values in the mask along an edge direction of the detection area and a center of the detection area; modify an original pixel value of the pixel in the detection area at the center of the mask according to the determined new pixel value; and display the modified new pixel value in the frame.

The boundary pixels of the detection area are determined by the following equation:

$$I(p) = \frac{\sum_{q \in B_\epsilon(p)} w(p, q)[I(q) + \nabla I(q)(p - q)]}{\sum_{q \in B_\epsilon(p)} w(p, q)}$$

In this equation p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and ∇I(q) indicates a gradient value of the known pixel.

The processor is further configured to conceal the video identification mark with a preset box when the detection area in the frame of the video cannot be identified.

Aspects of the disclosure also provide a non-transitory readable storage medium comprising instructions, executable by a processor for performing a method. The method includes detecting a video on a display of a device, wherein the video includes a plurality of frames; identifying a detection area in at least one frame of the plurality of frames of the video; detecting a video identification mark in the detection area of the at least one frame; and concealing the video identification mark based on pixel values of boundary pixels of the detection area.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1A:
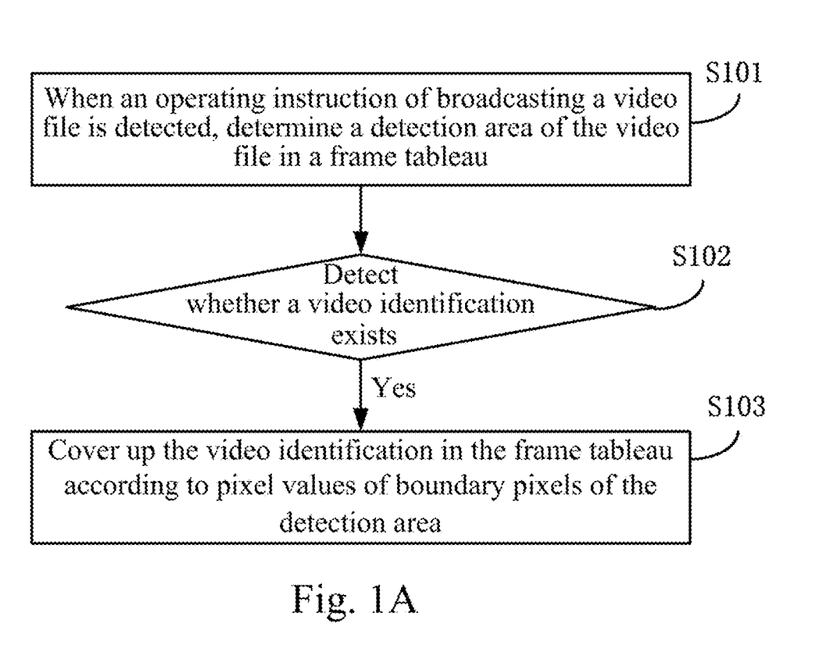
FIG. 1A is a flow chart illustrating a method for processing an identification of a video file, according to an exemplary aspect of the present disclosure.
Figure 1B:
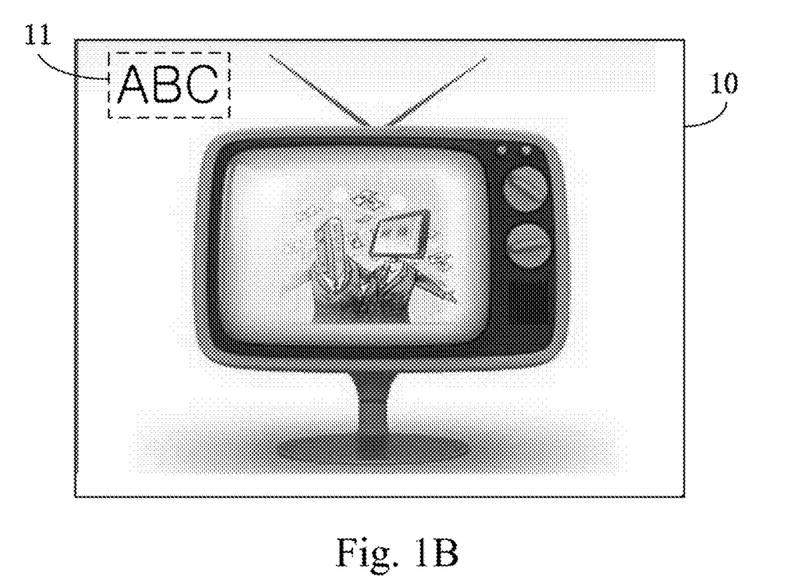
FIG. 1B illustrates a scene view when broadcasting a video file, according to an exemplary aspect of the present disclosure.

FIG. 1A is a flow chart illustrating a method for processing an identification of a video file, according to an exemplary aspect. FIG. 1B illustrates a scene view when broadcasting a video file, according to an exemplary aspect. The method for processing an identification of a video file may be applied in a video terminal (such as a smart mobile phone, a tablet computer, and a smart TV). As shown in FIG. 1A, the method for processing an identification of a video file may include the following steps S101-S103.

In step S101, when an operating instruction of broadcasting a video file is detected, a detection area of the video file in a frame tableau is determined.

In an aspect, the frame tableau is an image tableau of each frame of the video file when broadcasting. In an aspect, when a broadcasting operation is performed to a selected video file, the user may determine a detection area in a current tableau of the video file. In another aspect, the content provider may detect identification positions on all the video files provided by itself on a server, and record detection areas at which the identification positions are located, then when the user needs to broadcast the video file, he/she may acquire the detection area of the video file in the frame tableau from the server. The detection area may be determined by pixel positions in the frame tableau. For example, FIG. 1B shows a frame tableau with a resolution of 480×360, which is broadcasting by a video terminal 10. In the frame tableau, the video identification is "ABC" in a dotted box 11, and the detection area of the video file is a rectangular area defined by a pixel [50, 30] to a pixel [70, 51] in the frame tableau, such as a rectangular area defined by the dotted box 11.

In step S102, whether a video identification exists in the frame tableau needing to be broadcasted is detected in the detection area.

In an aspect, it is possible to match image content in the detection area with a preset video identification mask, so as to determine whether a video identification exists in the frame tableau. In another aspect, it is possible to directly identify a feature of the image content in the frame tableau by using an image identification, so as to determine whether a video identification exists in the frame tableau.

In step S103, if the video identification exists, the video identification in the frame tableau is covered up according to pixel values of boundary pixels of the detection area.

In an aspect, pixel values of pixels at which the video identification is located may be modified by referring to pixel values of boundary pixels of the detection area at which the video identification is located, then the modified pixel values are displayed at the corresponding pixels, such that the covered video identification may be properly fused in the frame tableau.

In the present aspect, when the user needs to broadcast a video file, by determining the detection area of the video file in a frame tableau, it is possible to avoid the detection to the whole frame, thereby the covering of the video identification is more targeted; and in the case that the video identification is detected to be appeared in the frame tableau needing to be broadcasted in the detection area, the video identification on the frame tableau of the video file in the detection area is covered up, thereby visual perception of the user when watching the video file is improved.

In an aspect, determining the detection area of the video file in the frame tableau may include:

determining a preset number of frame pictures of the video file; and detecting the detection area of the video file in the frame tableau according to the preset number of frame pictures; or, sending relevant information of the video file to a server; and receiving the detection area of the video file in the frame tableau determined according to the relevant information from the server.

In an aspect, detecting the detection area of the video file in the frame tableau according to the preset number of frame pictures may include:

determining a suspected area of the preset number of frame pictures; and performing an edge detection to the preset number of frame pictures in the suspected area so as to determine the detection area of the video file in the frame tableau.

In an aspect, detecting in the detection area whether the video identification exists in the frame tableau needing to be broadcasted includes:

determining an identification pyramid of the video file, the identification pyramid including a plurality of identification masks;

matching the plurality of identification masks with image content in the detection area respectively, so as to obtain the preset number of matching results;

determining whether a maximum in the preset number of matching results is greater than a preset threshold; and if the maximum is greater than the preset threshold, determining that the video identification exists in the frame tableau.

In an aspect, covering up the video identification according to pixel values of boundary pixels of the detection area may include:

determining a new pixel value of a pixel in the detection area at a center of a set size mask by known pixel values in the mask along an edge direction of the detection area and towards a center of the detection area;

modifying an original pixel value of the pixel in the detection area at the center of the mask according to the new pixel values; and displaying the modified new pixel value on the frame tableau.

In an aspect, in the step of determining new pixel value of pixel in the detection area by known pixel values in the set size mask along the edge direction of the detection area and towards the center of the detection area, the boundary pixels of the detection area are determined by the following equation:

$$I(p) = \frac{\sum_{q \in B_\epsilon(p)} w(p, q)[I(q) + \nabla I(q)(p - q)]}{\sum_{q \in B_\epsilon(p)} w(p, q)}$$

wherein p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and $\nabla I(q)$ indicates a gradient value of the known pixel.

In an aspect, the method may further include:

if the detection area of the video file in the frame tableau cannot be determined, covering up the video identification by a preset box; and after determining the detection area, performing the detecting in the detection area whether a video identification exists in a frame tableau needing to be broadcasted.

As to how to cover up the video identification in the video file, the following aspects may be referred to.

So far the above method provided by aspects of the present disclosure may avoid the detection to the whole frame, make the covering of the video identification to be more targeted, and improve visual perception of the user when watching the video file.

Hereinafter, the technical solutions provided by aspects of the present disclosure are explained by specific aspects.

Figure 2A:
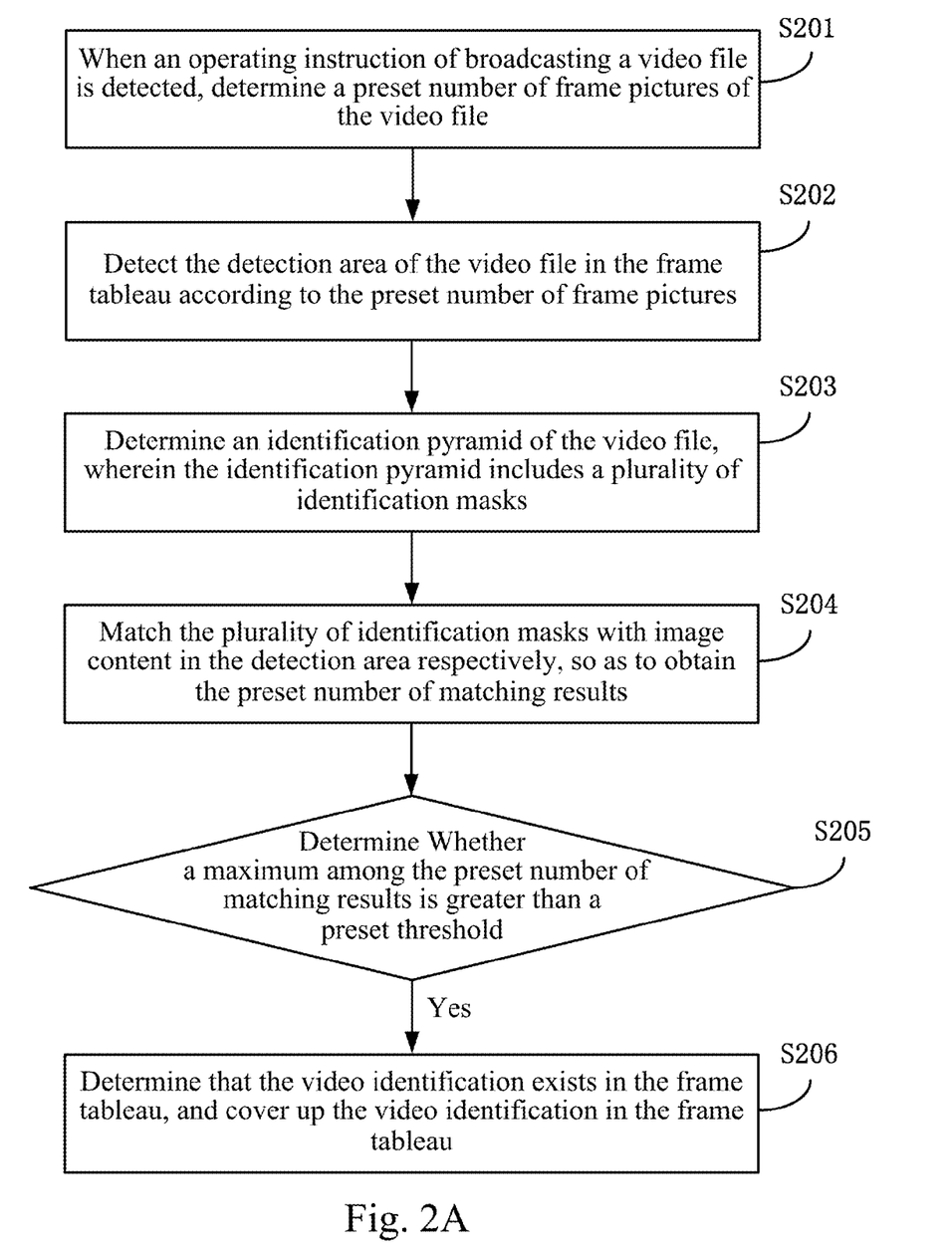
FIG. 2A is a flow chart illustrating a method for processing an identification of a video file, according to a first exemplary aspect of the present disclosure.
Figure 2B:
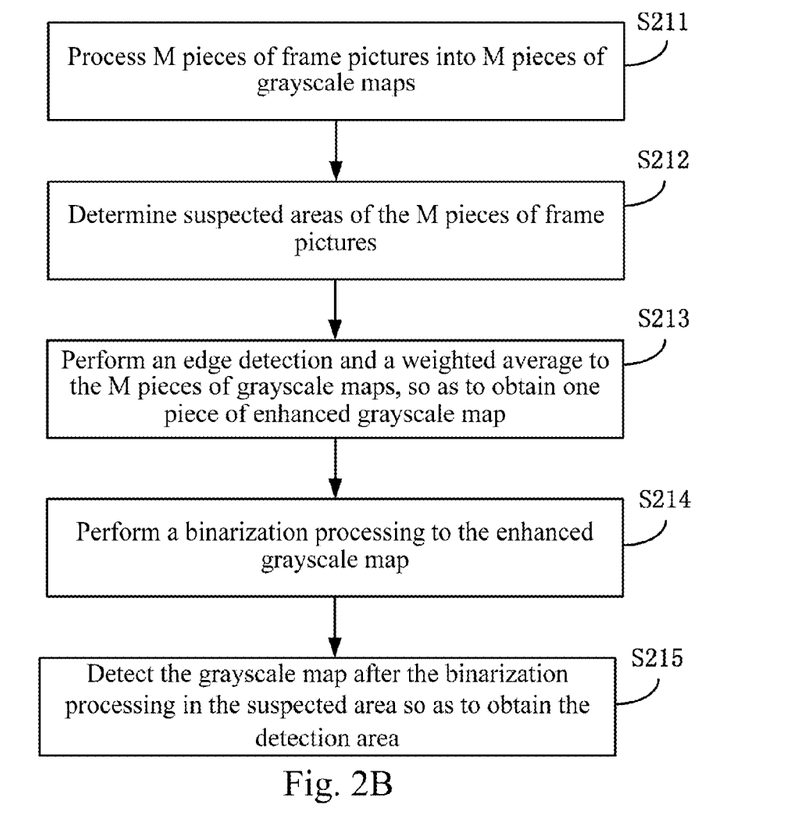
FIG. 2B is a flow chart illustrating a method for determining an identification pyramid, according to a first exemplary aspect of the present disclosure.
Figure 2C:
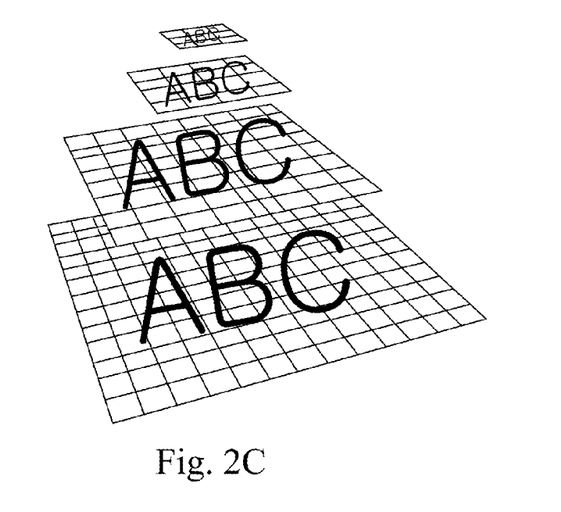
FIG. 2C is a schematic diagram illustrating the identification pyramid, according to the first exemplary aspect of the present disclosure.
Figure 2D:
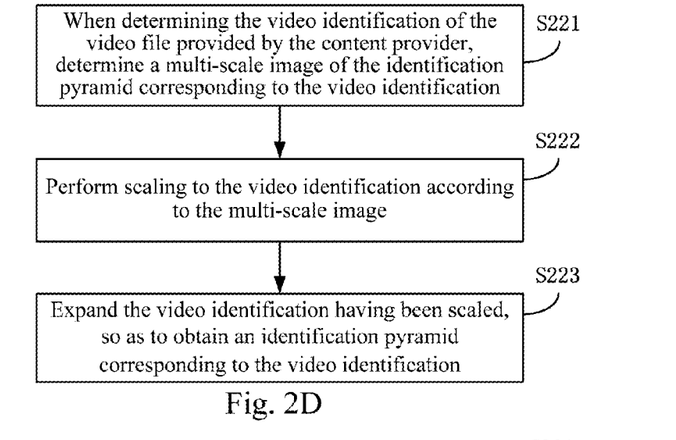
FIG. 2D is a flow chart illustrating step S202, according to the first exemplary aspect of the present disclosure.

FIG. 2A is a flow chart illustrating a method for processing an identification of a video file, according to a first exemplary aspect, FIG. 2B is a flow chart illustrating a method for determining an identification pyramid, according to a first exemplary aspect, FIG. 2C is a schematic diagram illustrating the identification pyramid, according to a first exemplary aspect, and FIG. 2D is a flow chart illustrating step S202, according to a first exemplary aspect. The present aspect is illustrated by using the above methods provided by aspects of the present disclosure and using an example in which a detection area in a frame tableau is detected at the video terminal locally and the video identification is detected by an identification pyramid. As shown in FIG. 2A, the method includes the following steps.

In step S201, when an operating instruction of broadcasting a video file is detected, a preset number of frame pictures of the video file are determined.

In an aspect, the preset number may be determined based on a computing power of the video terminal. If the video terminal has a higher computing power, the preset number may be set greater, thereby the position of the detection area may be more accurate.

In step S202, the detection area of the video file in the frame tableau is detected according to the preset number of frame pictures.

Figure 1C:
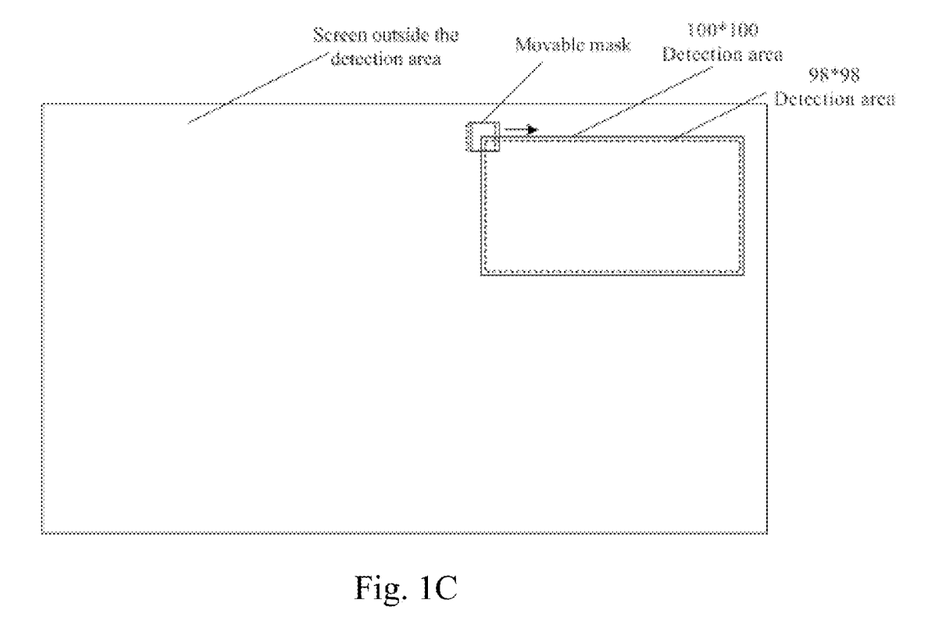
FIG. 1C is a schematic diagram of a procedure of covering up a detection area, according to a first exemplary aspect of the present disclosure.

The description to step S202 may be referred to the description to FIG. 1C, which is not elaborated herein.

In step S203, an identification pyramid of the video file is determined, wherein the identification pyramid includes a plurality of identification masks.

The description to the identification pyramid may be referred to FIG. 2C, and the description of determining the identification pyramid in step S203 may be referred to the description of FIG. 2D, which is not elaborated herein.

In step S204; the plurality of identification masks are respectively matched with image content in the detection area, so as to obtain the preset number of matching results.

As shown in FIG. 2C, there are 4 identification masks, and the 4 identification masks correspond to a video identification "ABC" having different resolutions, for example, the resolutions are 50×50, 100×50, 200×100, 200×200, and etc. successively from small to large. The person skilled in the art could understand that the resolutions of the identification masks shown in FIG. 2C only tend to illustrate different sizes of the masks, the identification masks may be determined according to resolutions of frame tableaus in the video file and size of the video identification, and the sizes of the identification masks are not restricted by the present disclosure.

For example, by matching the above-mentioned 4 identification masks with the video identification "ABC" on the frame tableau shown in FIG. 1B, 4 matching results may be obtained.

In step S205, whether a maximum among the preset number of matching results is greater than a preset threshold is determined.

In an aspect, the preset threshold may be determined according to detection accuracy of the video identification. If the accuracy is high, the preset threshold may be set relatively large. The magnitude of the preset threshold is not restricted by the present disclosure.

In step 206, if the maximum is greater than the preset threshold, it is determined that the video identification exists in the frame tableau, and the video identification in the frame tableau is covered up.

In an aspect, the description about covering the video identification in the video tableau may be referred to the description of the above step S103 which is not elaborated herein.

Hereinafter, illustrations to the above step S201 to step S203 are given in combination with FIG. 2B to FIG. 2D.

In the above step S202, illustrative explanations are given by assuming that the preset number is M. As shown in FIG. 2B, the step S202 includes the following steps.

In step S211, M pieces of frame pictures are processed into M pieces of grayscale maps.

In a video file, frame pictures of the video file are generally displayed to the user in a colorful way. In order to reduce the amount of computations of image processing, the present disclosure may first process M pieces of frame pictures into M pieces of grayscale maps.

In step S212, suspected areas of the M pieces of frame pictures are determined.

In an aspect, the suspected area may be determined by a video identification library stored in the video terminal. For example, with respect to the video files provided by the content provider "ABC", the video identifications thereof are located at a left upper side of the frame tableau; with respect to the video files provided by the content provider "DEF", the video identifications thereof are located at a right upper side of the frame tableau. By the suspected area, an approximate location of the video identification in the frame tableau may be determined, which may avoid to detect the video identification in the entire frame tableau, thereby reducing the computation amount of detecting the video identification.

In step S213, an edge detection and a weighted average are performed to the M pieces of grayscale maps, so as to obtain one piece of enhanced grayscale map.

In step S214, a binarization processing is performed to the enhanced grayscale map.

In step S215, the grayscale map after the binarization processing is detected in the suspected area so as to obtain the detection area.

Through the processes of the above step S211 to step S215, only by performing a grayscale map processing, a weighted average, a binarization processing, and etc., the computation amount for determining the detection area may be greatly reduced.

As shown in FIG. 2D, the step S202 may include the following steps.

In step S221, when determining the video identification of the video file provided by the content provider, a multi-scale image of the identification pyramid corresponding to the video identification is determined.

In an aspect, the multi-scale image of the identification pyramid may include a multiple of masks having different resolutions. For example, in the video file provided by the content provider "ABC", the multi-scale image of the identification pyramid corresponding to the video identification "ABC" includes masks having resolutions 50×50, 100×50, 200×100, 200×200, and etc.; and in the video file provided by the content provider "DEF", the multi-scale image of the identification pyramid corresponding to the video identification "DEF" includes masks having resolutions 25×25, 50×50, 100×50, 200×100, and etc. Therefore, in the present disclosure, for different video identifications, the sizes of resolutions of multi-scale image of the corresponding identification pyramid may be different, which is not restricted by the present disclosure.

In step S222, scaling is performed to the video identification according to the multi-scale image.

In step S223, the video identification having been scaled is expanded, so as to obtain an identification pyramid corresponding to the video identification.

For example, the effective pixels on the video identification having been multi-scale scaled are expanded to the surrounding within a range of one pixel distance, such that a group of expanded identification pyramid corresponding to the video identification may be obtained.

In the present aspect, when the user needs to broadcast a video file, the detection area is detected by performing an image processing to the suspected area of the video file in the frame tableau, which achieves a detection procedure from coarse to fine, avoids the detection to the whole frame, and makes the covering of the video identification to be more targeted, meanwhile, by covering up the video identification of the video file on the frame tableau in the detection area, the visual perception of the user when watching the video file is improved.

Figure 3:
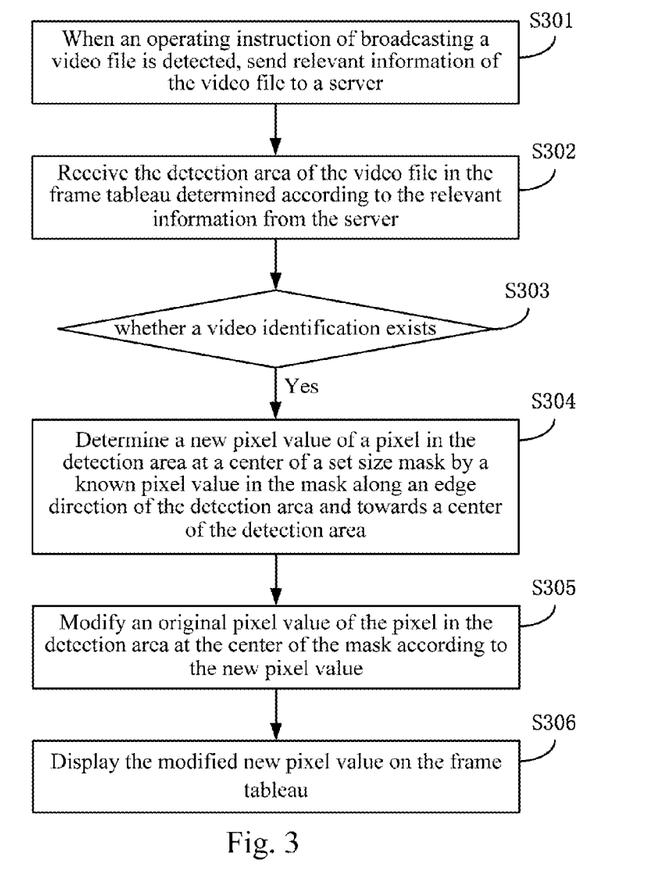
FIG. 3 is a flow chart illustrating a method for processing an identification of a video file, according to a second exemplary aspect of the present disclosure.

FIG. 3 is a flow chart illustrating a method for processing an identification of a video file, according to a second exemplary aspect. In the present aspect, the illustrations are given by utilizing the above method provided by aspects of the present disclosure, and using an example of acquiring the detection area in the frame tableau from a server and how to cover up the video identification. As shown in FIG. 3, the method includes the following steps.

In step S301, when an operating instruction of broadcasting a video file is detected, relevant information of the video file is sent to a server.

In step S302, the detection area of the video file in the frame tableau determined according to the relevant information is received from the server.

In the above step S301 and step S302, the manufacturer of smart TVs, after determining the video files which may be provided by itself to the user, may detect position of the video identification in each video file, and record the position of the video identification in a cloud-side server of the manufacturer of smart TVs, thereby the detection to the position of the video identification may be avoided when the video terminal broadcasts the video file, and the computation complexity of the video terminal may be reduced.

When watching the video file broadcasted by TV, the user may send relevant information of the video file to the server, then the server determines the detection area relevant to the video file according to the relevant information. In an aspect, the relevant information may be a name of the content provider of the video file (such as ABC content provider), source information of the video file (such as from which video website), and the like.

In step S303, whether a video identification exists in a frame tableau needing to be broadcasted is detected in the detection area.

The description to step S303 may be referred to the description to the above step S203, which is not elaborated herein.

In step S304, if the video identification exists, a new pixel value of a pixel in the detection area at a center of a set size mask is determined by known pixel values in the mask along an edge direction of the detection area and towards a center of the detection area.

In step S305, an original pixel value of the pixel in the detection area at the center of the mask is modified according to the new pixel value.

In step S306, the modified new pixel value is displayed on the frame tableau.

In the above step S304 to step S306, in an aspect, after determining the detection area, for example, the resolution of the detection area is 100*100 the size of the movable mask (i.e., a sliding window) is set to be 5*5, as shown in FIG. 2, the mask is set such that a center thereof is located at a pixel in the detection area whose pixel value is to be determined, then the mask may first moves along an edge direction of the detection area, and new pixel values of the edge pixels of the detection area are determined by the known pixel values of pixels in the mask, and after the determination of the new pixel values of the edge pixels, new pixel values of 98*98 edge pixels of the detection area are determined in the same way along the 98*98 edge pixels, and so on, until new pixel values of all pixels in the detection area are completely determined, and the new pixel values in the detection area are displayed in the detection area. For example, after determining the new pixel values of the edge pixels of the detection area, an area in the detection area in which new pixel values are not yet determined is narrowed to 98*98, and for the 98*98 detection area, the similar way is adopted to determine the pixel values of border pixels having resolution of 98*98, i.e., by determining the new pixel values of the boundary pixels of the detection area, and pushing inward the center of the detection area to 96*96, then 94*94, and so on, the detection area is further reduced by pushing inward layer by layer, the pixel values corresponding to the pixels in the detection area are modified to the new pixel values, so as to realize the covering to the video identification.

In addition, in the above example, only a new pixel value of one pixel in the detection area is determined once, however, new pixel values of more than one pixels (such as 2 pixels, 3 pixels) in the detection area may be determined every time, and the more than one pixels may be multiple adjacent pixels in the detection area.

In an aspect, step 304 may determine the boundary pixels of the detection area by the following equation:

$$I(p) = \frac{\sum_{q \in B_\epsilon(p)} w(p,q)[I(q) + \nabla I(q)(p-q)]}{\sum_{q \in B_\epsilon(p)} w(p,q)}$$

wherein p indicates a current pixel whose pixel value needs to be modified, which is located in the detection area at the center of the mask q indicates the known pixel in the set size mask B, I(p) indicates the modified pixel value corresponding to the current pixel, I(q) indicates a pixel value of a pixel whose pixel value is known in the mask B, w(p,q) indicates a weighted value, and ∇I(q) indicates a gradient value of the known pixel. In an aspect, w(p,q) may be used for defining contribution of individual pixels to p pixel in the mask B, w(p,q) may be set according to a distance between p pixel and q pixel, or may be set by synthetically considering a distance between p pixel and q pixel, a distance from q to a tangent line of p, and the like, which is not restricted by the present disclosure.

In the present aspect, by acquiring the detection area of the video file in the frame tableau from the server, the real-time detection of the video terminal may be avoided, and the computation amount for detection of the video terminal is decreased, at the same time, the video identification can be quickly positioned; and by modifying the pixel values of the pixels at which the video identification is located with reference to the pixel values of the pixels adjacent to the video identification, the modified pixel values are displayed at the corresponding pixels, thereby the covered video identification may be properly fused in the frame tableau.

Figure 4:
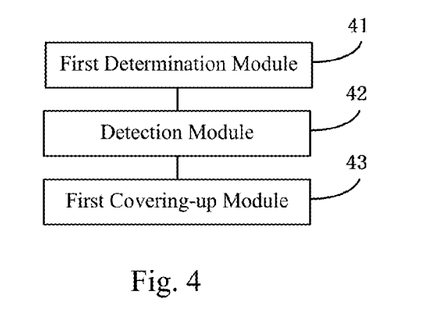
FIG. 4 is a block diagram illustrating a device for processing an identification of a video file, according to an exemplary aspect of the present disclosure.

FIG. 4 is a block diagram illustrating a device for processing an identification of a video file, according to an exemplary aspect. As shown in FIG. 4, the device for processing an identification of a video file includes: a first determination module 41, a detection module 42, and a first covering-up module 43.

The first determination module 41 is configured to, when an operating instruction of broadcasting a video file is detected, determine a detection area of the video file in a frame tableau.

The detection module 42 is configured to detect in the detection area determined by the first determination module 41 whether a video identification exists in a frame tableau needing to be broadcasted.

The first covering-up module 43 is configured to, if the detection module 42 detects that the video identification exists, cover up the video identification in the frame tableau according to pixel values of boundary pixels of the detection area.

Figure 5:
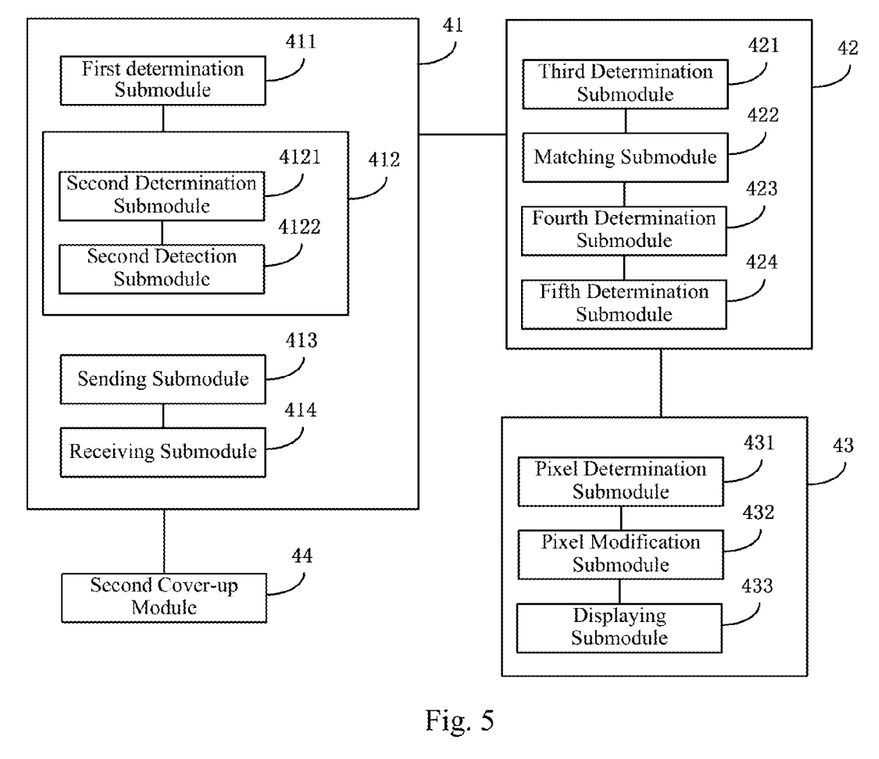
FIG. 5 is a block diagram illustrating another device for processing an identification of a video file, according to an exemplary aspect of the present disclosure.

FIG. 5 is a block diagram illustrating another device for processing an identification of a video file, according to an exemplary aspect. As shown in FIG. 5, on the basis of the above aspect shown in FIG. 5, the first determination module 41 may include:

a first determination submodule 411 configured to determine a preset number of frame pictures of the video file; and a first detection submodule 412 configured to detect the detection area of the video file in the frame tableau according to the preset number of frame pictures determined by the first determination submodule 411, or a sending submodule 413 configured to send relevant information of the video file to a server; and a receiving submodule 414 configured to receive the detection area of the video file in the frame tableau determined according to the relevant information sent by the sending submodule from the server.

In an aspect, the first detection submodule 412 may include:

a second determination submodule 4121 configured to determine a suspected area of the preset number of frame pictures; and a second detection submodule 4122 configured to perform an edge detection to the preset number of frame pictures determined by the second determination submodule 4121 in the suspected area so as to determine the detection area of the video file in the frame tableau.

In an aspect, the detection module 42 may include:

a third determination submodule 421 configured to determine an identification pyramid of the video file, the identification pyramid including a plurality of identification masks:

a matching submodule 422 configured to match the plurality of identification masks determined by the third determination submodule 421 respectively with image content in the detection area, so as to obtain the preset number of matching results:

a fourth determination submodule 423 configured to determine whether a maximum in the preset number of matching results obtained by the matching submodule 422 is greater than a preset threshold; and a fifth determination submodule 424 configured to, if the fourth determination submodule 423 determines that the maximum in the preset number of matching results is greater than the preset threshold, determine that the video identification exists in the frame tableau.

In an aspect, the first covering-up module 43 may include:

a pixel determination submodule 431 configured to, determine a new pixel value of a pixel in the detection area at the center of a set size mask by known pixel values in the mask along an edge direction of the detection area and towards a center of the detection area;

a pixel modification submodule 432 configured to modify an original pixel value of the pixel in the detection area at the center of the mask according to the new pixel value determined by the pixel determination submodule 431; and a displaying submodule 433 configured to display the new pixel value modified by the pixel modification submodule 432 on the frame tableau.

In an aspect, the pixel determination submodule 432 determines the boundary pixels of the detection area by the following equation:

$$I(p) = \frac{\sum_{q \in B_\epsilon(p)} w(p, q)[I(q) + \nabla I(q)(p - q)]}{\sum_{q \in B_\epsilon(p)} w(p, q)}$$

wherein p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and $\nabla I(q)$ indicates a gradient value of the known pixel.

In an aspect, the device may further include:

a second covering-up module 44 configured to, if the first determination module 41 cannot determine the detection area of the video file in the frame tableau, cover up the video identification by a preset box; and after the first determination module 41 determines the detection area, the detection module 42 performs the detecting in the detection area whether a video identification exists in a frame tableau needing to be broadcasted.

With respect to the devices in the above aspects, the specific manners for performing operations for individual modules therein have been described in detail in the aspects regarding the methods, which will not be elaborated herein.

Figure 6:
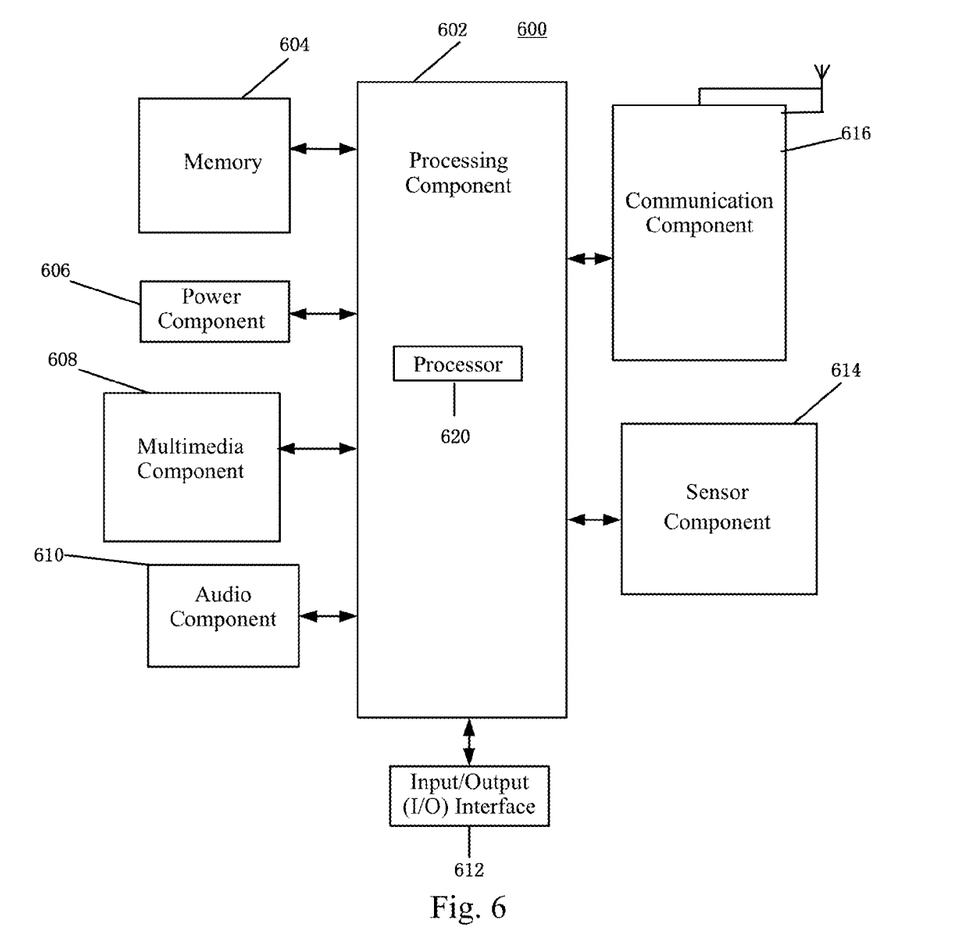
FIG. 6 is a block diagram illustrating a device adaptable for processing an identification of a video file, according to an exemplary aspect of the present disclosure.

FIG. 6 is a block diagram of a device 600 for implementing touch key and fingerprint identification, according to an exemplary aspect. For example, the device 600 may be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some aspects, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some aspects, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary aspect, the communication component 616 receives a broadcast signal or broadcast associated information from an external broadcast management system via a broadcast channel. In one exemplary aspect, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:
1. A method comprising:
  detecting a video on a display of a device, wherein the video includes a plurality of frames;
  identifying a detection area in at least one frame of the plurality of frames of the video;
  detecting a video identification mark in the detection area of the at least one frame; and
  concealing the video identification mark based on pixel values of boundary pixels of the detection area, wherein concealing the video identification mark includes:
    determining a new pixel value of a pixel in the detection area at a center of a set size mask by known pixel values in the mask along the edge direction of the detection area and towards the center of the detection area;
    modifying an original pixel value of the pixel in the detection area at the center of the mask according to the new pixel value; and
    displaying the modified new pixel value in the frame, wherein the boundary pixels of the detection area are determined by:

$$I(p) = \frac{\sum_{q \in B_\epsilon(p)} w(p, q)[I(q) + \nabla I(q)(p - q)]}{\sum_{q \in B_\epsilon(p)} w(p, q)}$$

wherein p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and ∇I(q) indicates a gradient value of the known pixel.

2. The method of claim 1, wherein identifying the detection area includes:
  selecting a number of frames from the plurality of frames of the video; and
  detecting the detection area based on the selected number of frames.

3. The method of claim 2, wherein identifying the detection area further includes:
  estimating an area in a probable location of the video identification mark in each of the selected number of frames; and
  performing an edge detection in the estimated area in each of the selected number of frames to determine the detection area of the video.

4. The method of claim 2, wherein identifying the detection area includes:
  sending information associated with the video to a server; and
  receiving from the server a location of the detection area of the video based on the information.

5. The method of claim 1, wherein detecting the video identification mark includes:
  determining an identification pyramid of the video, the identification pyramid including a plurality of identification masks;
  matching the plurality of identification masks with image content in the detection area;
  obtaining a number of matches based on the matching;
  determining whether the number of matches is greater than a threshold number of matches; and
  determining that the video identification mark exists in the frame when the number of matches is greater than the threshold number of matches.

6. The method of claim 1, further comprising:
  concealing the video identification mark with a preset box when the detection area in the frame of the video cannot be identified.

7. A device comprising:
  a processor; and
  a memory for storing instructions executable by the processor, wherein the processor is configured to:
    detect a video on a display of a device, wherein the video includes a plurality of frames;
    identify a detection area in at least one frame of the plurality of frames of the video;
    detect a video identification mark in the detection area of the at least one frame; and
    conceal the video identification mark based on pixel values of boundary pixels of the detection area,
  wherein when concealing the video identification mark, the processor is configured to:
    determine a new pixel value of a pixel in the detection area at a center of a set size mask by known pixel values in the mask along the edge direction of the detection area and towards the center of the detection area;
    modify an original pixel value of the pixel in the detection area at the center of the mask according to the new pixel value; and
    display the modified new pixel value in the frame,
  wherein the boundary pixels of the detection area are determined by:

$$I(p) = \frac{\sum_{q \in B_\epsilon(p)} w(p, q)[I(q) + \nabla I(q)(p - q)]}{\sum_{q \in B_\epsilon(p)} w(p, q)}$$

wherein p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and of ∇I(q) indicates a gradient value of the known pixel.

8. The device of claim 7, wherein the processor is further configured to:
  select a number of frames from the plurality of frames of the video; and
  detect the detection area based on the selected number of frames.

9. The device of claim 8, wherein the processor is further configured to:
  estimate an area in a probable location of the video identification mark in each of the selected number of frames; and
  perform an edge detection in the estimated area in each of the selected number of frames to determine the detection area of the video.

10. The device of claim 7, wherein the processor is further configured to:
  send information associated with the video to a server; and
  receive from the server a location of the detection area of the video based on the information.

11. The device of claim 7, wherein the processor is further configured to:
  determine an identification pyramid of the video, the identification pyramid including a plurality of identification masks;
  match the determined plurality of identification masks with image content in the detection area;
  obtain a number of matches based on the matching;
  determine whether the number of matches is greater than a threshold number of matches; and
  determine that the video identification mark exists in the frame when the number of matches is greater than the threshold number of matches.

12. The device of claim 7, the processor is further configured to:
  conceal the video identification mark with a preset box when the detection area in the frame of the video cannot be identified.

13. A non-transitory computer-readable storage medium storing instructions executable by a processor for performing a method comprising:
- detecting a video on a display of a device, wherein the video includes a plurality of frames;
- identifying a detection area in at least one frame of the plurality of frames of the video;
- detecting a video identification mark in the detection area of the at least one frame; and
- concealing the video identification mark based on pixel values of boundary pixels of the detection area, wherein concealing the video identification mark includes:
  - determining a new pixel value of a pixel in the detection area at a center of a set size mask by known pixel values in the mask along the edge direction of the detection area and towards the center of the detection area;
  - modifying an original pixel value of the pixel in the detection area at the center of the mask according to the new pixel value; and
  - displaying the modified new pixel value in the frame, wherein the boundary pixels of the detection area are determined by:

$$I(p) = \frac{\sum_{q \in B_\epsilon(p)} w(p, q)[I(q) + \nabla I(q)(p - q)]}{\sum_{q \in B_\epsilon(p)} w(p, q)}$$

wherein p indicates a current pixel whose pixel value needs to be modified, which is located in the detection area at the center of the mask, q indicates the known pixel in the set size mask B, I(p) indicates the modified pixel value corresponding to the current pixel, I(q) indicates a pixel value of a pixel whose pixel value is known in the mask B, w(p,q) indicates a weighted value, and $\nabla I(q)$ indicates a gradient value of the known pixel.

* * * * *